June 30, 1925.
F. BREISIG
1,544,127
METHOD AND ARRANGEMENT FOR DETERMINING CROSSTALK IN MULTICIRCUIT SYSTEMS
Filed Aug. 13, 1921
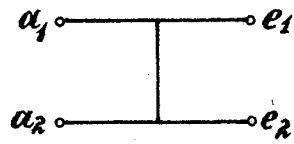
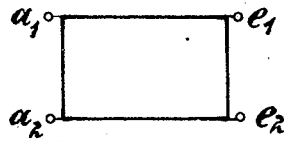
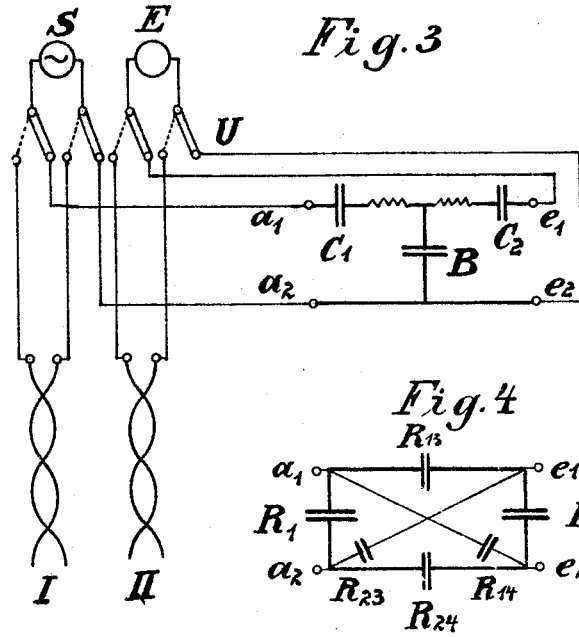
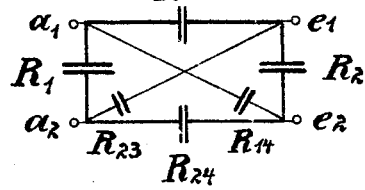
Inventor:
Franz Breisig
by R. B. Foster
Attorney.

Patented June 30, 1925.

1,544,127

UNITED STATES PATENT OFFICE.

FRANZ BREISIG, OF BERLIN, GERMANY.

METHOD AND ARRANGEMENT FOR DETERMINING CROSSTALK IN MULTICIRCUIT SYSTEMS.

Application filed August 13, 1921. Serial No. 492,034.

*To all whom it may concern:*

Be it known that I, FRANZ BREISIG, residing at 15 Leipzigerstrasse, Berlin, Germany, have invented certain new and useful Improvements in Methods and Arrangements for Determining Crosstalk in Multicircuit Systems, of which the following is a specification.

The method of determining the magnitude of crosstalk or mutual induction in telephone systems consists in comparing the transmission path existing as a result of their inequalities between two mutually interfering circuits with an artificial standard line of adjustable damping. The apparatus used hitherto for this purpose are of the kind employed in testing telephonic transmission in general, one type of these apparatus being the English artificial standard cable and another the German type of the regulable distortionless artificial line with the characteristic impedance of open overhead lines. Sections of standard or artificial line of which these arrangements are composed are added to each other in series until the required attenuation is obtained. The attenuation constant of the artificial line through which speech is transmitted to the same extent as by crosstalk is then taken as a standard of the crosstalk. This figure is here called the attenuation equivalent of the crosstalk. It is known that the determination of this figure in this way is rendered difficult by the fact that the timbre of the speech transmitted by crosstalk is much clearer than of that transmitted through the named artificial lines so that the exact attenuation equivalent of the crosstalk is hard to estimate. Besides, the figure which results from such tests does not only depend on the attenuation of the artificial line but also on its characteristic impedance, since the amount of current taken and delivered by each circuit depends also on its characteristic impedance. The problem of determining the constituent values of an artificial line with calculable damping which, in transmitting sounds, gives the same timbre as crosstalk and an attenuation equivalent of definite meaning has been solved by me theoretically and thereby I have discovered relations which, although hitherto unknown, are yet so simple that it is thought that no theoretical explanation is necessary for their comprehension.

The present invention consists in giving such values to the artificial lines used for determining the amount of crosstalk in multi-circuit systems, particularly in multi-pair telephone cables, that the impedances of the artificial line as seen from the transmitter and the receiver are made equal to the impedances measured from the one and the other end respectively of the crosstalk circuit to be tested. In testing lines with open distant ends—which are the most frequent tests made—the aforesaid object may be accomplished by means of condensers whose capacity is adjusted to equal that of the real or phantom lines connected to sender and receiver.

Some specific ways of carrying out the invention will now be described with reference to the drawings in which Fig. 1 is a diagrammatic representation of an artificial line, called a double T or H arrangement, Fig. 2 is a diagrammatic representation of another form of an artificial line, called a double Π or quadrangle arrangement.

Fig. 3 shows the circuits of a testing equipment employing an H arrangement, and Fig. 4 shows a quadrangle arrangement that might be employed in lieu of the H in Fig. 3.

The artificial lines may be made up of resistances, inductances, or capacities, or one or a combination of these arranged in the form of a T or H as represented in Fig. 1, or in the form of a single or double Π. It is also known that it is immaterial whether the impedances of the two limbs of the circuit ($a_1$ $e_1$, and $a_2$ $e_2$) are equal, or whether the entire impedance lies in one limb.

Fig. 3 shows the entire testing arrangement used for measuring the crosstalk between the electrically short, open lines I and II. The invention relates more particularly to the arrangement located between the terminals $a_1$ $a_2$ and $e_1$ $e_2$. On the four-lever switch U being thrown into the one or the other of its two extreme positions the transmitter S and the receiver E are connected either to the lines to be tested or to the artificial line which, in Fig. 3, is arranged in the form of a T or an unsymmetrical H whose main branches contain condensers $C_1$ and $C_2$ to which resistances may be added to reproduce the dielectric losses. The amount of energy that passes through from the terminals $a_1$, $a_2$ at the sending end to the terminals $e_1$, $e_2$ at the receiving end will be the smaller the greater the conductivity of the bridge B. The electrical values of the bridge are altered until the volume transmitted is perceived to be equal in the receiver in both positions of the switch U.

The condition specified for the artificial line in accordance with the invention, viz. that the values of the impedances connected to the transmitter and receiver in the two extreme positions of the switch U shall be equal, is completely satisfied for practical purpose in testing mutual induction, or the crosstalk between two independent metallic circuits of practically equal capacity, if the condensers $C_1$ and $C_2$ are equal to each other and have the same capacity as the limbs of the circuits for which they are substituted by the aid of the switch. As in practical cases the value of the attenuation equivalent of crosstalk is higher than 4 the impedance of the bridge B is negligible in comparison with the other impedances of the arrangement. When it is a question of determining the amount of crosstalk between a phantom circuit and a physical circuit belonging to the same quad the condensers $C_1$ and $C_2$ must have different values, the capacity of the condenser on the phantom side of the arrangement being made equal to the capacity of the phantom circuit and the capacity of the condenser on the physical circuit side being made equal to that of the physical circuit.

When the conductor in the bridge B is a condenser as shown in the drawing the transmission due to crosstalk and the transmission through the artificial line will exactly coincide with each other both with respect to attenuation equivalent and to distortion; the transmitted speech will be absolutely equal in both cases.

But when the attenuation equivalent is great, i. e. if there is little crosstalk, the condenser required would be inconveniently large. It may be replaced without any serious disadvantage by a simple resistance or a combination of resistance and capacity. The only effect of this will be that the timbre in transmission through the artificial line will be somewhat clearer than in the transmission due to crosstalk.

The above-described valuation of artificial lines used in testing the crosstalk between physical or phantom circuits which are open at the far end, and short in an electrical sense, is a definite result of my theoretical investigation. Its simple and clear rule gives a lucid indication of the points to be considered in other cases. When the lines are not open at the far end, or when they are not short in an electrical sense, the same conditions for sender and receiver will be established in switching over from the real lines to the artificial line if the artificial line has the same impedances on either side as the lines for which it is substituted.

If the two circuits are in a practical sense free from disturbing crosstalk the impedance of the conductor in the artificial line which couples the transmitting with the receiving end, for instance the impedance of the bridge in the case of an H arrangement, is negligible in comparison with the impedance of the artificial line measured from $a_1$ to $a_2$ or $e_1$ to $e_2$. Hence it is possible to test the crosstalk between lines closed at their far ends and also between lines of considerable length, if the impedances of the artificial line from $a_1$ to $a_2$ and from $e_1$ to $e_2$ are made equal to the corresponding impedance of the lines to be tested. The values of these impedances, if unknown, may be ascertained by an auxiliary measurement. An approximate reproduction of these impedances is sufficient to accomplish the object in view.

The attenuation equivalent of the crosstalk can be calculated if the impedances in the artificial line are known. Calculations of this kind are well known in the art so that they need not be gone into here.

In Fig. 4 a quadrangle arrangement suitable for carrying out the novel method is shown which may be inserted in the place of the H arrangement in Fig. 3 by interconnecting the terminals of like signs in these two figures. Connected between the terminals $a_1$ and $a_2$ is an impedance $R_1$ of equal value with that of the first line to be tested, and between the terminals $e_1$, $e_2$ there is an impedance equal to that of the second line to be tested. When short lines are to be tested the impedances chosen for $R_1$ and $R_2$ will be condensers of the respective line capacities. Furthermore, each terminal at the $a$ end is connected to each terminal at the $e$ end through a conductor of high impedance $R_{13}$, $R_{14}$, $R_{23}$, $R_{24}$ which will preferably consist of condensers. There will be no transmission from $a_1$, $a_2$ to $e_1$, $e_2$ if the impedances of the four connections are all of equal values, whereas current will pass through if these values are unequal. This form in which the values of these four impedances can be changed individually or in sets to such an amount that the transmission due to crosstalk between the real lines is equal to the transmission through the artificial line, is particularly adapted for determining attenuation equivalents of high value as a condition exists in which no energy at all is allowed to pass from the $a_1$ $a_2$ side to the $e_1$ $e_2$ side.

I claim:—

1. A method of determining the extent of crosstalk between circuits in telephone systems, consisting in giving the branches of the artificial line such values that for the case in question its impedances regarded from the transmitter end and the receiver end are equal to the impedances of the corresponding tested circuits, and so adjusting a variable element of the artificial line that the magnitudes and timbres of the sound transmitted through crosstalk and of the sound transmitted through the artificial line are made practically the same.

2. A method of determining the extent of crosstalk between circuits in telephone systems, consisting in giving the branches of the artificial line such values that for the case in question its impedances regarded from the transmitter end and the receiver end are equal to the impedances of the corresponding tested circuits, and in alternately connecting a transmitter and a receiver to the circuits whose crosstalk is to be measured and to the two ends of the artificial line, and so adjusting a variable element of the artificial line that the magnitudes and timbres of the sound transmitted through crosstalk and of the sound transmitted through the artificial line are made practically the same.

3. An arrangement for determining the extent of crosstalk between telephone circuits comprising a transmitter, a receiver, a regulable artificial line, and switching means for connecting the transmitter and the receiver to two of the said telephone circuits and to the two ends of the artificial line alternately, the impedance of the artificial line regarded from its end that is connected to the transmitter being equal to the impedance of the telephone circuit that is connected to the transmitter, and the impedance of the artificial line regarded from its end that is connected to the receiver being equal to the impedance of the telephone circuit that is connected to the receiver.

4. An arrangement for determining the extent of crosstalk between telephone circuits comprising, a transmitter; a receiver; an adjustable artificial line in the form of quadrangle element; and switching means for alternately connecting the transmitter and the receiver to two telephone circuits and to the pairs of terminals at the two ends of the said artificial line, the current path between the said pair of terminals that is connected to the transmitter being such that its impedance is equal or approximately equal to the telephone line connected to the transmitter, and the path between the pair of terminals connected to the receiver being such that its impedance is equal, or nearly equal, to that of the telephone line connected to the receiver, and four paths of high impedances being connected between the said pairs of terminals, these four paths being adapted to be altered in such a way that the transmission due to crosstalk between the two said circuits may be made equal to the transmission through the artificial line.

5. An arrangement for determining the extent of crosstalk between telephone circuits comprising, a transmitter; a receiver; an adjustable artificial line in the form of quadrangle element; and switching means for alternately connecting the transmitter and the receiver to two telephone circuits and to the pairs of terminals at the two ends of the said artificial line, the current path between the said pair of terminals that is connected to the transmitter being such that its impedance is equal, or approximately equal, to the telephone line connected to the transmitter, and the path between the pair of terminals connected to the receiver being such that its impedance is equal, or nearly equal, to that of the telephone line connected to the receiver, and four paths of high impedances being connected between the said pairs of terminals, these four paths being adapted to be altered separately or in sets in such a way that the transmission due to crosstalk between the two said circuits is equal to the transmission through the artificial line.

6. An arrangement for determining the extent of crosstalk between telephone circuits which are short in an electrical sense comprising; a transmitter; a receiver; an adjustable artificial line in the form of quadrangle element with all its limbs formed of condensers; and switching means for alternately connecting the transmitter and the receiver to two telephone circuits and to the pairs of terminals at the two ends of the said artificial line, the current path between the said pair of terminals that is connected to the transmitter being such that its impedance is equal, or approximately equal, to the telephone line connected to the transmitter, and the path between the pair of terminals connected to the receiver being such that its impedance is equal, or nearly equal, to that of the telephone line connected to the receiver, and four paths of high impedances being connected between the said pairs of terminals, these four paths being adapted to be altered in such a way that the transmission due to crosstalk between the two said circuits may be made equal to the transmission through the artificial line.

In testimony whereof I have signed this application in the presence of two witnesses.

FRANZ BREISIG.

Witnesses:
PETER LAUNMER,
ARNOLD W. MÜLLER.